US010159190B2

(12) United States Patent
Coquat

(10) Patent No.: US 10,159,190 B2
(45) Date of Patent: Dec. 25, 2018

(54) ROUND BALE SLED SYSTEM AND METHOD OF USE

(71) Applicant: Roderick Coquat, Weatherford, TX (US)

(72) Inventor: Roderick Coquat, Weatherford, TX (US)

( * ) Notice: Subject to any disclaimer, the term of this patent is extended or adjusted under 35 U.S.C. 154(b) by 0 days.

(21) Appl. No.: 15/648,452

(22) Filed: Jul. 12, 2017

(65) Prior Publication Data

US 2018/0014464 A1    Jan. 18, 2018

Related U.S. Application Data

(60) Provisional application No. 62/361,152, filed on Jul. 12, 2016.

(51) Int. Cl.
*A01D 87/12* (2006.01)
*A01D 90/08* (2006.01)
*A01D 85/00* (2006.01)
*A01K 5/00* (2006.01)

(52) U.S. Cl.
CPC ......... *A01D 87/126* (2013.01); *A01D 85/005* (2013.01); *A01D 87/122* (2013.01); *A01D 87/127* (2013.01); *A01D 90/083* (2013.01); *A01K 5/00* (2013.01)

(58) Field of Classification Search
CPC .......... B62B 19/04; B62B 19/02; B62B 13/00
See application file for complete search history.

(56) References Cited

U.S. PATENT DOCUMENTS

| 3,921,837 A | 11/1975 | Vandewater |
| 4,256,426 A | 3/1981 | Buss |
| 4,520,005 A | 5/1985 | Yao |
| 4,863,075 A * | 9/1989 | Romer ...................... A45F 3/46 108/19 |
| 2007/0216118 A1* | 9/2007 | Jackson ................. B62B 1/208 280/47.131 |

* cited by examiner

*Primary Examiner* — Bryan A Evans

(57) ABSTRACT

A sled assembly for the transport of a one or more round bales across a ground surface being soft. Said sled configured to slide on top of said ground surface. Said hitch assembly having said lowered configuration and said raised configuration. Said hitch assembly configured to selectively attach to said vehicle and to enable said sled assembly to be dragged behind said vehicle. Said sled comprising said side rail assemblies and said cross beams. Said hitch assembly fixed to a first end of said sled. Said sled assembly further comprising a one or more wheel assemblies.

7 Claims, 15 Drawing Sheets

ROUND BALE SLED SYSTEM AND METHOD OF USE

CROSS-REFERENCE TO RELATED APPLICATIONS

This application claims benefit to U.S. Patent Application No. 62/361,152 filed on Jul. 12, 2016.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

This disclosure relates generally to a Round Bale Sled System and Method of Use. Examples of prior art can be found at U.S. Pat. No. 4,256,426 A and U.S. Pat. No. 3,921,837 A. None of the known inventions and patents, taken either singularly or in combination, is seen to describe the instant disclosure as claimed.

With reference to FIG. 12, note that a sled assembly 100 would be useful for carrying said one or more round bales 1102 across a ground surface 1210. Said one or more round bales 1102 can each weigh upwards of 1000-1500 pounds. Current trailers for the collection and transportation of round bales are fitted with axels and wheels in the tradition of road trailers. This approach is well suited for hard surfaces such as concrete roads, but not so for plowed fields filled with loose top soil and, often, mud. Accordingly, said sled assembly 100 is fitted with a side runners 504 for the purpose of sliding across the top of said ground surface 1210 as pulled by said tractor 1202.

Sleds are well-known and often used for moving a vehicle across ice and snow in cold climates. Here, however, unlike the prior art, the current sled is adapted for agricultural purposes. First, it is noted that said side runners 504 can each be designed with a plurality of lower runner interfaces 602 in order to spread out the weight of said one or more round bales 1102. This can be paramount to succeeding at carrying upwards of 4 tons of weight across a loose top soil, as is known in the art. Likewise, said rail caps 502 are designed to ensure said side runners 504 do not dig into said ground surface 1210 while moving forward. Further, said hitch assembly 104 is designed for ease of attaching aid sled assembly 100 to said tractor 1202. Similarly, a hitch loop assembly 206 (having a cable portion 208 and a sleeve portion 210) means that said hitch assembly 104 is adapted to absorb quick starts and stops as between said tractor 1202 and said sled 102. As well, said sled 102 is adapted for holding round bales on said cross beams 108 in a novel manner which protects the contents of said one or more round bales 1102 and ensures safe transport of said one or more round bales 1102 off of a soft surface such as said ground surface 1210.

Existing trailers are adapted to use on hard soil and road infrastructure, there is a need for a system for use on soft fields.

Likewise, fields are often full of holes dug by rodents, armadillos, badgers, wild hogs, and the like, a result of which is that wheels will often get caught in these holes.

The benefits of said sled assembly 100 do not stop at ease of transportation. Rather, the field itself is less impacted by said sled assembly 100 than a traditional trailer on wheels. Since weight is spread out on said sled assembly 100, the field is not packed down.

Efficiency is also a focus since farm workers will not be obligated to make so many trips when collecting said one or more round bales 1102 with said sled assembly 100. This is because upwards of six bales are accommodated on the current system. More than six may be possible. For example, by attaching more than one of said sled assembly 100 to one another in the manner of a train, or by extending said side runners 504 and adding additional pieces to said cross beams 108.

No prior art is known to the Applicant.

None of the known inventions and patents, taken either singularly or in combination, is seen to describe the instant disclosure as claimed.

BRIEF SUMMARY OF THE INVENTION

A sled assembly for the transport of a one or more round bales across a ground surface being soft. Said sled configured to slide on top of said ground surface. Said hitch assembly having said lowered configuration and said raised configuration. Said hitch assembly configured to selectively attach to said vehicle and to enable said sled assembly to be dragged behind said vehicle. Said sled comprising said side rail assemblies and said cross beams. Said hitch assembly fixed to a first end of said sled. Said sled assembly further comprising a one or more wheel assemblies.

BRIEF DESCRIPTION OF THE SEVERAL VIEWS OF THE DRAWING

FIG. 2A illustrates a perspective overview view of a lowered configuration 200a.

FIG. 3A illustrates an elevated first side view of a lowered configuration 200a.

FIG. 14A illustrates a perspective overview view of a first wheel configuration 1400a.

DETAILED DESCRIPTION OF THE INVENTION

Figure 1:
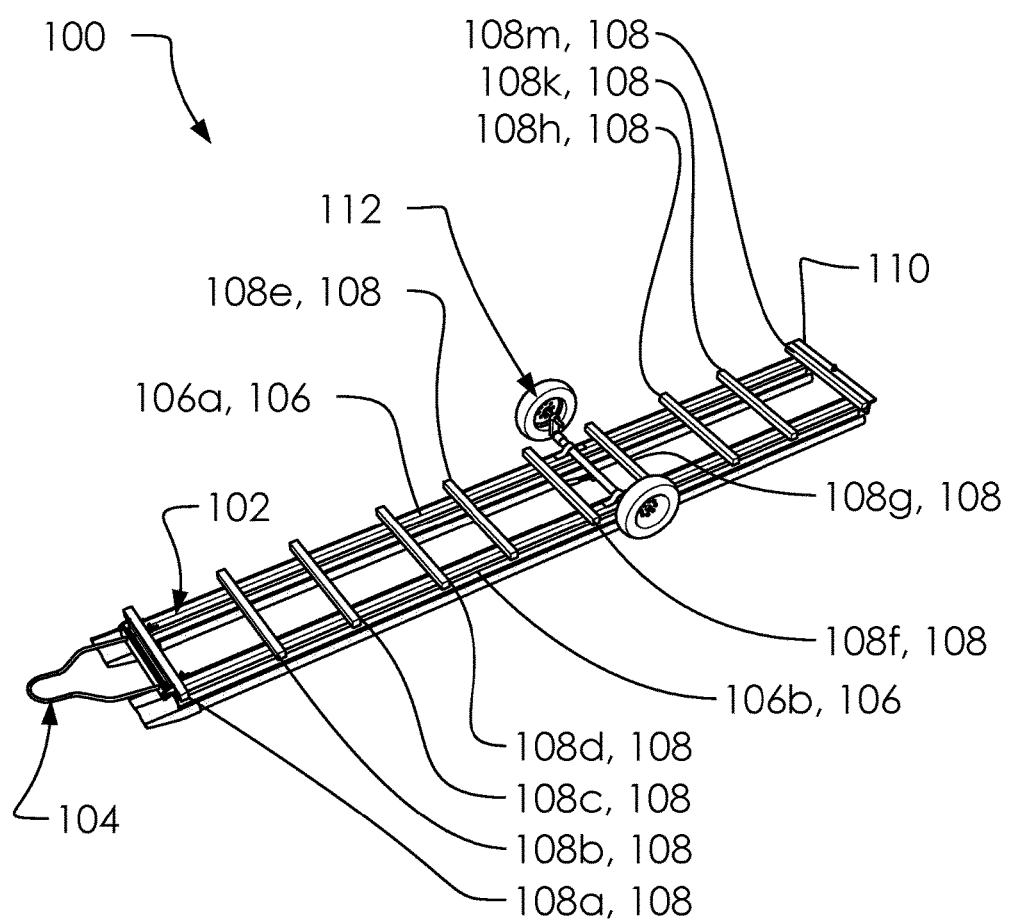
FIG. 1 illustrates a perspective overview view of a sled assembly 100.

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

These parts are illustrated in the figures and discussed below:
a sled assembly 100
a first sled assembly 100a
a second sled assembly 100b
a sled 102
a hitch assembly 104
a side rail assemblies 106
a first rail assembly 106a
a second rail assembly 106b
a cross beams 108
a first cross beam 108a
a second cross beam 108b
a cross beam 108c
a cross beam 108d
a cross beam 108e
a cross beam 108f
a cross beam 108g
a cross beam 108h
a cross beam 108k
a cross beam 108m
a cross beam 108n
a cross beam 108p
a bumper assembly 110
a wheel assembly 112
a plurality of sled assemblies 114
a first sled assembly 114a
a second sled assembly 114b
a lowered configuration 200a
a raised configuration 200b
a side bracket assemblies 202
a first side bracket assembly 202a
a second side bracket assembly 202b
a hitch loop assembly 206
a cable portion 208
a sleeve portion 210
a rotating axis 212
a one or more spring clamps 214
a first spring clamp 214a
a second spring clamp 214b
a one or more heights 300
a first height 300a
a second height 300b
a one or more leaf springs 302
a first leaf spring 302a
a second leaf spring 302b
a one or more hitch angles 304
a first hitch angle 304a
a second hitch angle 304b
a first end 400a
a second end 400b
a rail caps 502
a first cap 502a
a second cap 502b
a side runners 504
a first side runner 504a
a second side runner 504b
an U-brackets 506
a first U-bracket 506a
a second U-bracket 506b
an upper beams 508
a first upper beam 508a
a second upper beam 508b
a plurality of lower runner interfaces 602
a first lower portion 602a
a second lower portion 602b
a center edge 604
a one or more side edges 606
a first side edge 606a
a second side edge 606b
a first end 702
a second end 704
a leading edge 706
a trailing edge 708
a cross-beam 800
a bar 802
a back-bar 804
an ends 806
a first end 806a
a second end 806b
a one or more springs 808
a first spring 808a
a second spring 808b
a one or more washers 810
a first washer 810a
a second washer 810b
a one or more clamps 812
a first clamp 812a
a second clamp 812b
a one or more apertures 814
a first aperture 814a a second aperture 814b
a one or more apertures 816
a first aperture 816a
a second aperture 816b
a cross-beam structure 1000
a one or more cradles 1002
a first cradle 1002a
a second cradle 1002b
a third cradle 1002c
a fourth cradle 1002d
a fifth cradle 1002e
a length 1004
a cradle length 1006
a gap length 1008
a cradle width 1010
a one or more round bales 1102
a first bale 1102a
a second bale 1102b
a third bale 1102c
a fourth bale 1102d
a fifth bale 1102e
a sixth bale 1102f
a vehicle 1202
a receiver hitch 1204
a bale holder 1206
a ground surface 1210
a one or more wheel assemblies 1300
a first wheel assembly 1300a
a second wheel assembly 1300b
a first wheel configuration 1400a
a second wheel configuration 1400b
a spreader 1402
a one or more clamps 1404
a first clamp 1404a
a second clamp 1404b
a one or more wheels 1406
a first wheel 1406a
a second wheel 1406b
a hinge 1408
an axel 1410
a hitch ball 1500
a train configuration 1502

FIG. 1 illustrates a perspective overview view of a sled assembly 100.

In one embodiment, said sled assembly 100 can comprise said first sled assembly 100a, said second sled assembly 100b, said sled 102, said hitch assembly 104, said side rail assemblies 106, said cross beams 108, said bumper assembly 110, said bumper assembly 110 and said wheel assembly 112.

In one embodiment, said side rail assemblies 106 can comprise said first rail assembly 106a and said second rail assembly 106b.

In one embodiment, said cross beams 108 can comprise said first cross beam 108a, said second cross beam 108b, said cross beam 108c, said cross beam 108d, said cross beam 108e, said cross beam 108f, said cross beam 108g, said cross beam 108h, said cross beam 108k, said cross beam 108m, said cross beam 108n and said cross beam 108p.

In one embodiment, said plurality of sled assemblies 114 can comprise said first sled assembly 114a and said second sled assembly 114b.

Said sled assembly 100 can comprise a system for carrying objects across a soft substrate on said sled 102 and/or said wheel assembly 112. In one embodiment, said wheel assembly 112 can be selectively engaged and disengaged, as discussed below.

In one embodiment, said hitch assembly 104 can be attached and detached from a vehicle, as discussed below.

Figure 2A:
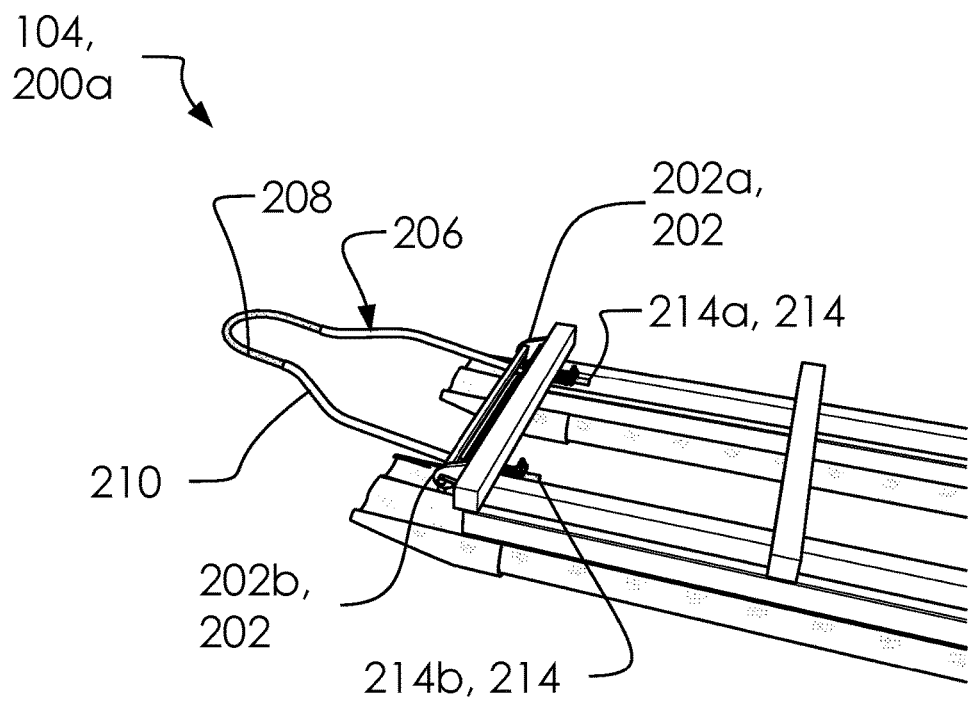

FIG. 2A illustrates a perspective overview view of a lowered configuration 200a.

Figure 2B:
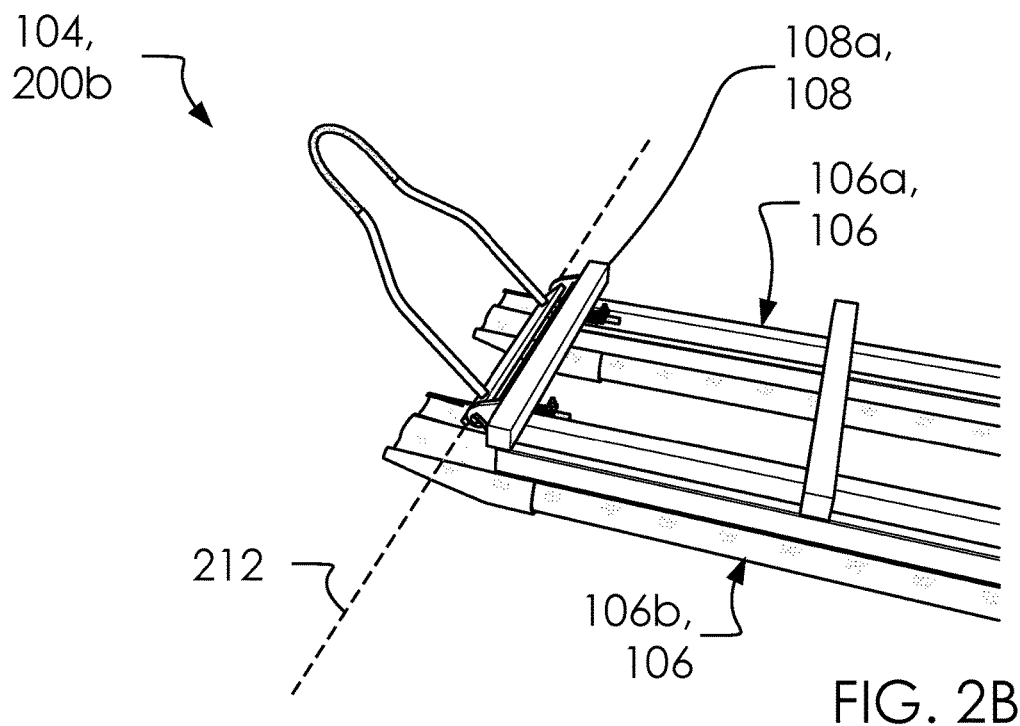
FIG. 2B illustrates a perspective overview view of a raised configuration 200b.

FIG. 2B illustrates a perspective overview view of a raised configuration 200b.

In one embodiment, said side bracket assemblies 202 can comprise said first side bracket assembly 202a and said second side bracket assembly 202b.

In one embodiment, said hitch loop assembly 206 can comprise said cable portion 208, said sleeve portion 210, said one or more spring clamps 214 and said second spring clamp 214b.

In one embodiment, said one or more spring clamps 214 can comprise said first spring clamp 214a and said second spring clamp 214b.

In one embodiment, said sled assembly 100 can comprise said lowered configuration 200a and said raised configuration 200b.

In one embodiment, said hitch assembly 104 can comprise said side bracket assemblies 202, said hitch loop assembly 206, said cable portion 208, said sleeve portion 210 and said rotating axis 212.

In one embodiment, said hitch assembly 104 can comprise a side bracket assemblies 202, and a hitch loop assembly 206. Said hitch assembly 104 can be rotated through a range of positions as illustrated in said lowered configuration 200a and said raised configuration 200b.

Said hitch loop assembly 206 can comprise a cable portion 208 and a sleeve portion 210. In one embodiment, said hitch loop assembly 206 can rotate on a rotating axis rotating axis 212 relative to said side bracket assemblies 202 and said sled 102, as illustrated.

In one embodiment, said hitch loop assembly 206 can selectively rotate between said side bracket assemblies 202, as is known in the art.

Figure 3A:
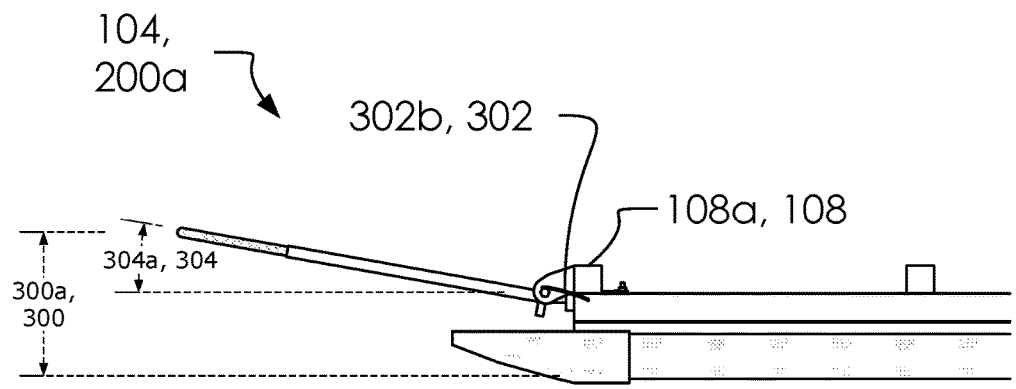

FIG. 3A illustrates an elevated first side view of a lowered configuration 200a.

Figure 3B:
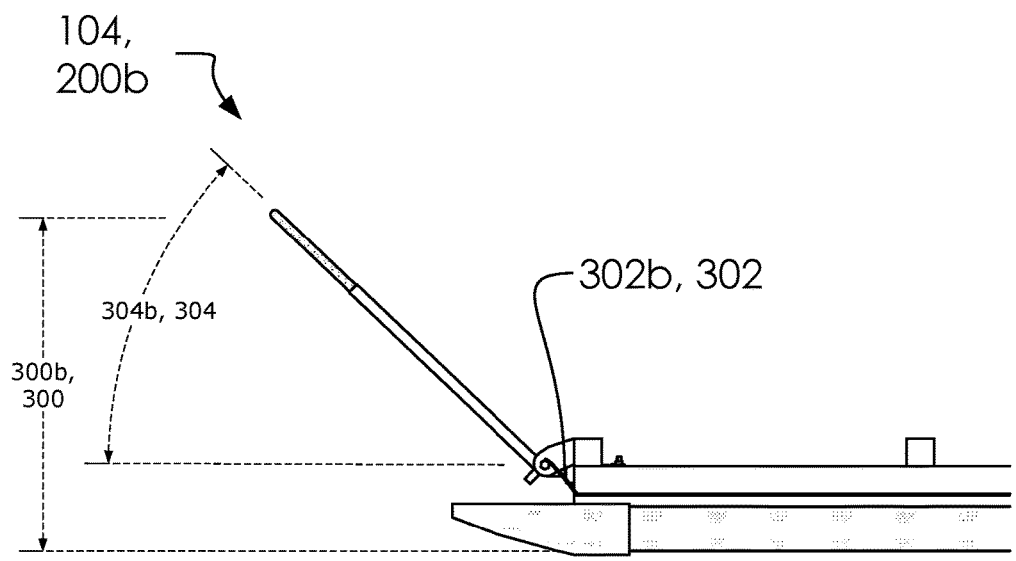
FIG. 3B illustrates an elevated first side view of a raised configuration 200b.

FIG. 3B illustrates an elevated first side view of a raised configuration 200b.

In one embodiment, said one or more heights 300 can comprise said first height 300a and said second height 300b.

In one embodiment, said one or more leaf springs 302 can comprise said first leaf spring 302a and said second leaf spring 302b.

In one embodiment, said one or more hitch angles 304 can comprise said first hitch angle 304a and said second hitch angle 304b.

In one embodiment, said hitch assembly 104 can comprise said second height 300b, said one or more leaf springs 302, said second leaf spring 302b and said one or more hitch angles 304.

In one embodiment, said hitch loop assembly 206 can comprise said one or more heights 300.

In one embodiment, said hitch assembly 104 can rotate between a range of angles, illustrated in part by said one or more hitch angles 304. Accordingly, said hitch assembly 104 can be positioned at a range of heights, illustrated in part by said one or more heights 300.

In one embodiment, said one or more leaf springs 302 can hook under said cross beams 108 and therefore limit the range of movement of said hitch assembly 104 by pressing against said cross beams 108, as illustrated in FIG. 3A.

Figure 4:
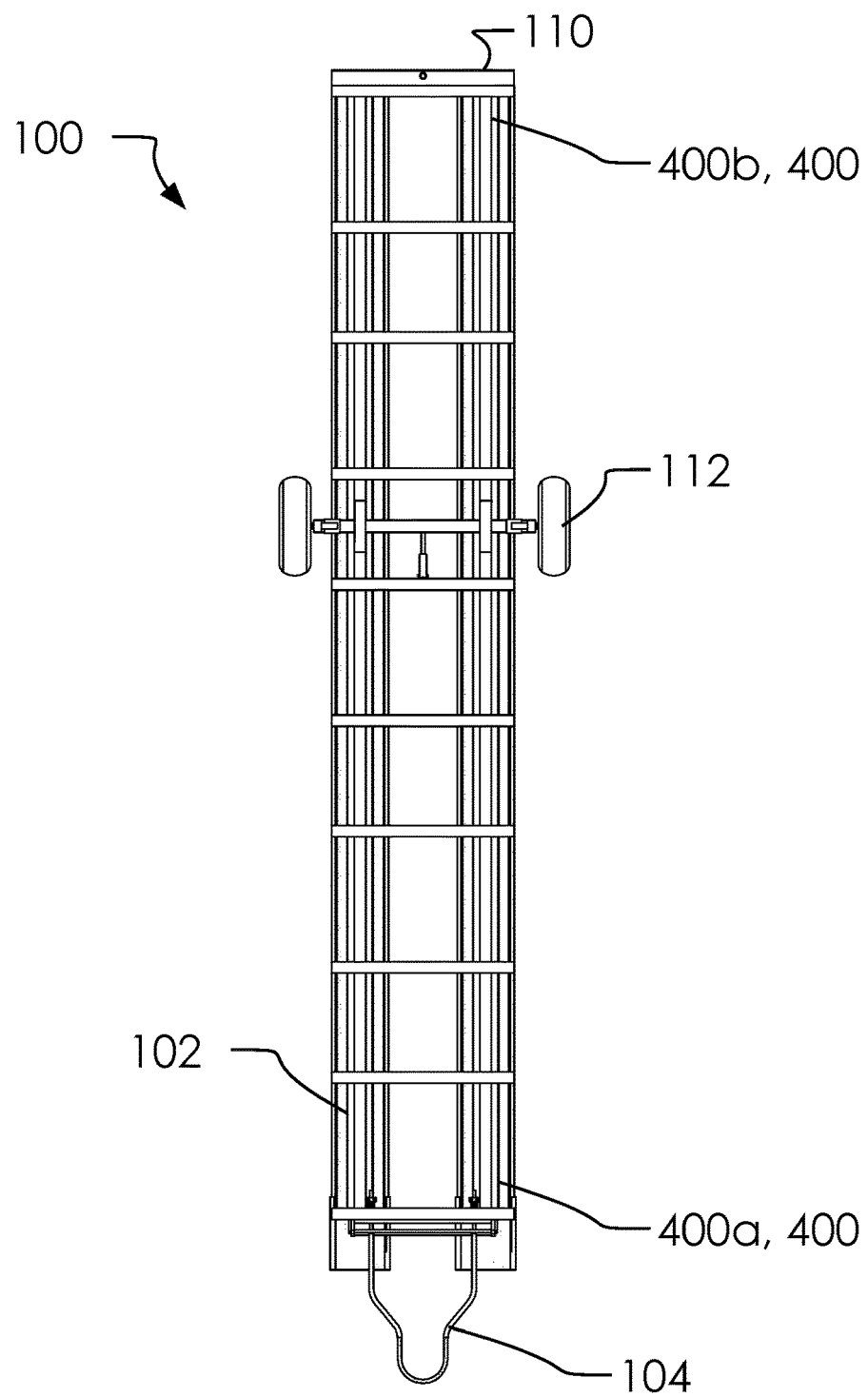
FIG. 4 illustrates an elevated top side view of a sled assembly 100.

FIG. 4 illustrates an elevated top side view of a sled assembly 100.

In one embodiment, said sled 102 can comprise said first end 400a and said second end 400b.

Figure 5A:
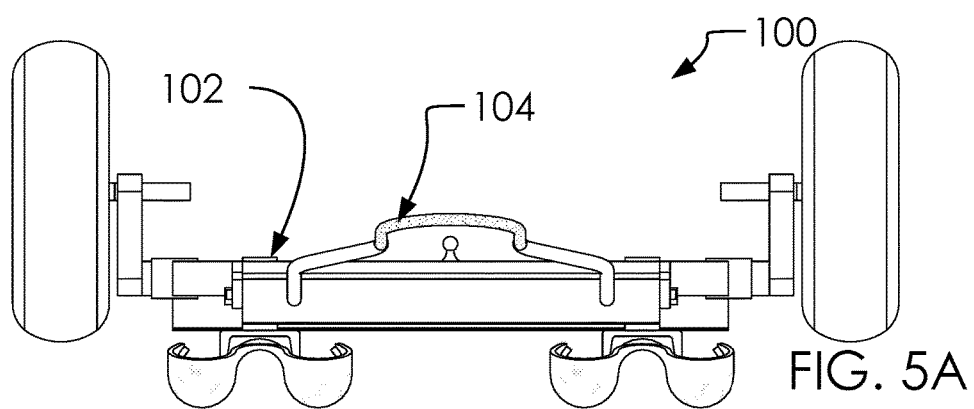
FIG. 5A illustrates an elevated front side view of a sled assembly 100 fully assembled.

FIG. 5A illustrates an elevated front side view of a sled assembly 100 fully assembled.

Figure 5B:
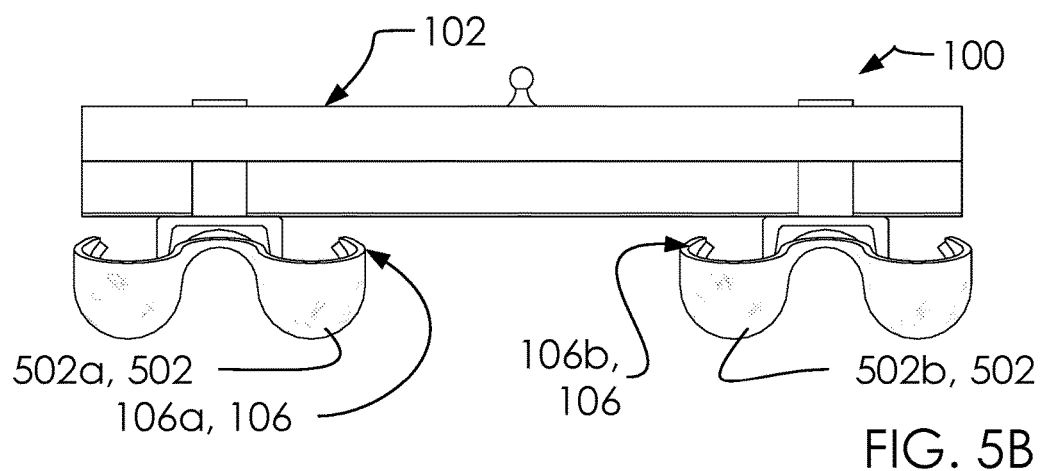
FIG. 5B illustrates an elevated front side view of a sled assembly 100 partially assembled.

FIG. 5B illustrates an elevated front side view of a sled assembly 100 partially assembled.

Figure 5C:
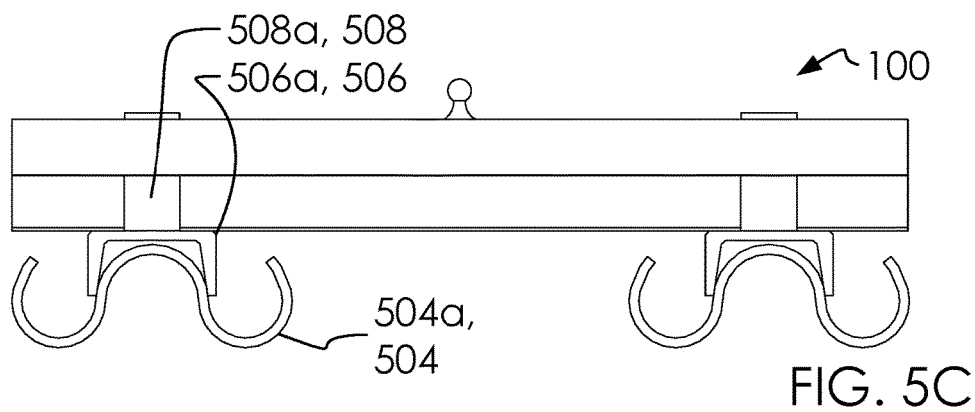
FIG. 5C illustrates an elevated front side view of a sled assembly 100 partially assembled.

FIG. 5C illustrates an elevated front side view of a sled assembly 100 partially assembled.

In one embodiment, said rail caps 502 can comprise said first cap 502a and said second cap 502b.

In one embodiment, said side runners 504 can comprise said first side runner 504a and said second side runner 504b.

In one embodiment, said U-brackets 506 can comprise said first U-bracket 506a and said second U-bracket 506b.

In one embodiment, said upper beams 508 can comprise said first upper beam 508a and said second upper beam 508b.

In one embodiment, said side rail assemblies 106 can comprise said rail caps 502, said side runners 504, said U-brackets 506 and said upper beams 508.

In one embodiment, said side rail assemblies 106 can each comprise said rail caps 502, a side runners 504, a U-brackets 506, and a upper beams 508. Said rail caps 502 can comprise a first cap 502a and a second cap 502b;

said side runners 504 can comprise a first side runner 504a and a second side runner 504b;

said U-brackets 506 can comprise a first U-bracket 506a and a second U-bracket 506b;

and said upper beams 508 can comprise a first upper beam 508a and a second upper beam 508b.

In one embodiment, said side rail assemblies 106 are arranged in alignment with the movement of said sled assembly 100;

wherein, said sled 102 slides across a field on a lower portion of said side rail assemblies 106 (such as said side runners 504 and said rail caps 502). In one embodiment, said rail caps 502 are attached to a forward portion of said side runners 504, as illustrated. In one embodiment, said side runners 504 are attached to said U-brackets 506, and said U-brackets 506 are attached to said upper beams 508. Finally, said cross beams 108 are attached substantially perpendicular to said upper beams 508, as illustrated.

Figures 6A, 6B, 6C:
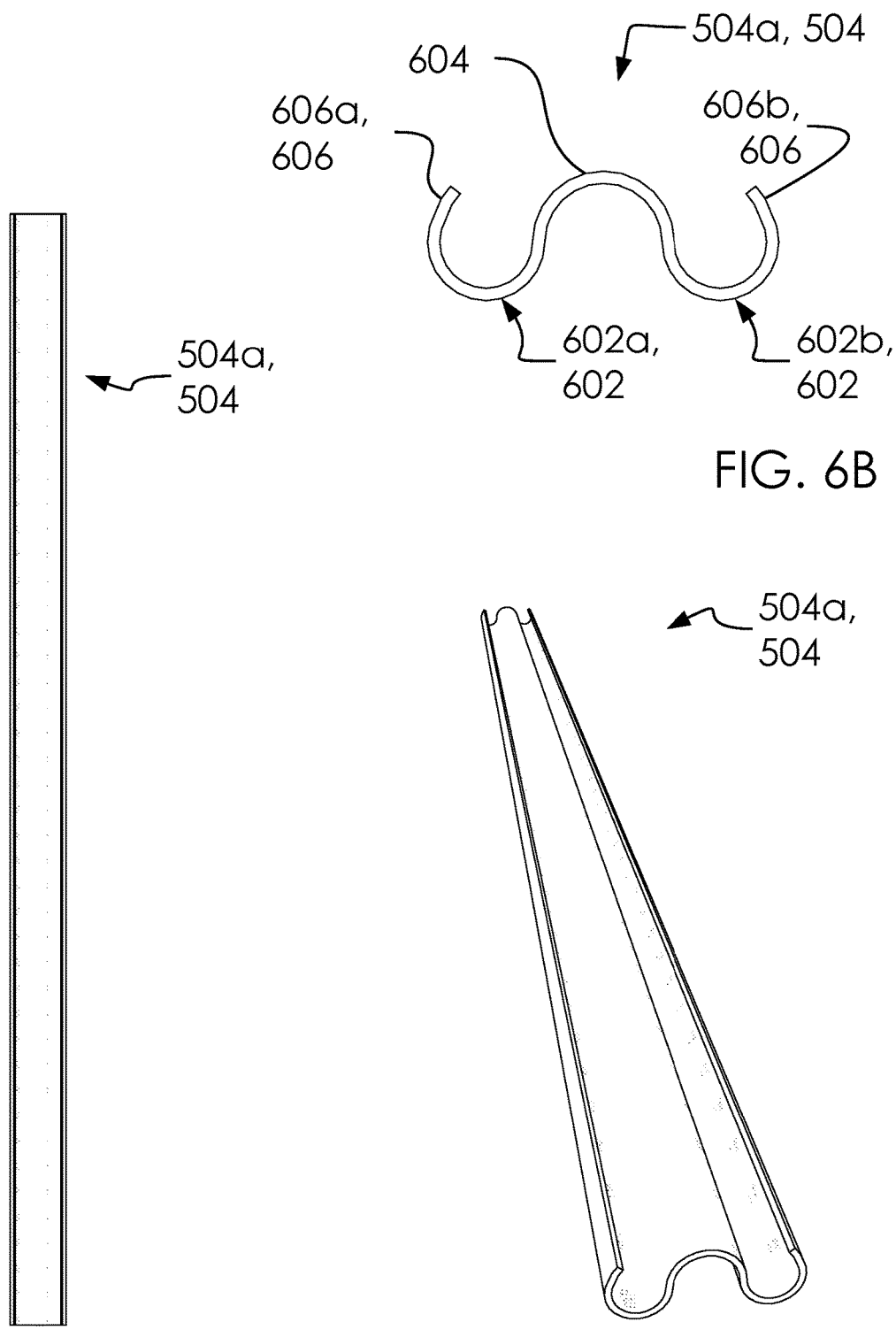
FIG. 6A illustrates an elevated top side view of a side runners 504.
FIG. 6B illustrates an elevated front side view of a side runners 504.
FIG. 6C illustrates a perspective overview view of a side runners 504.

FIG. 6A illustrates an elevated top side view of a side runners 504.

FIG. 6B illustrates an elevated front side view of a side runners 504.

FIG. 6C illustrates a perspective overview view of a side runners 504.

In one embodiment, said plurality of lower runner interfaces 602 can comprise said first lower portion 602a and said second lower portion 602b.

In one embodiment, said one or more side edges 606 can comprise said first side edge 606a and said second side edge 606b.

In one embodiment, said sled assembly 100 can comprise said second lower portion 602b and said second side edge 606b.

In one embodiment, said side runners 504 can comprise said plurality of lower runner interfaces 602, said center edge 604, said center edge 604 and said one or more side edges 606.

In one embodiment, said side runners 504 are shaped in a lower case "w" shape with two lower portions each which interface with a ground surface. In one embodiment, said side runners 504 can comprise road side railing common in civil engineering settings as is known in the art. In another embodiment, said side runners 504 can comprise a manufactured part being customized to the purposes of this disclosure. In one embodiment, said side runners 504 can comprise sharp bends in said center edge 604.

In one embodiment, said side runners 504 can each comprise a plurality of lower runner interfaces 602 (which can comprise a first lower portion 602a and a second lower portion 602b).

In one embodiment, said sled assembly 100 can slide along on said side runners 504 with said plurality of lower runner interfaces 602 spreading out the weight of said sled assembly 100 on each of said side runners 504.

Figure 7A:
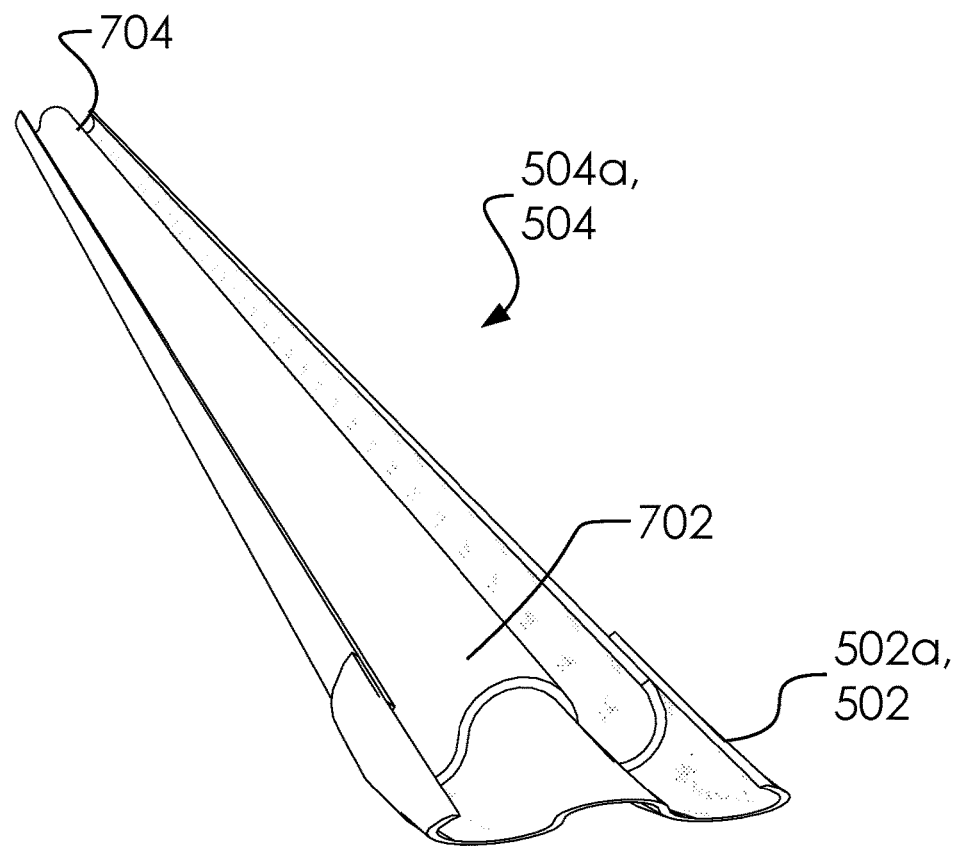
FIG. 7A illustrates a perspective overview view of a rail caps 502.

FIG. 7A illustrates a perspective overview view of a rail caps 502.

Figure 7B:
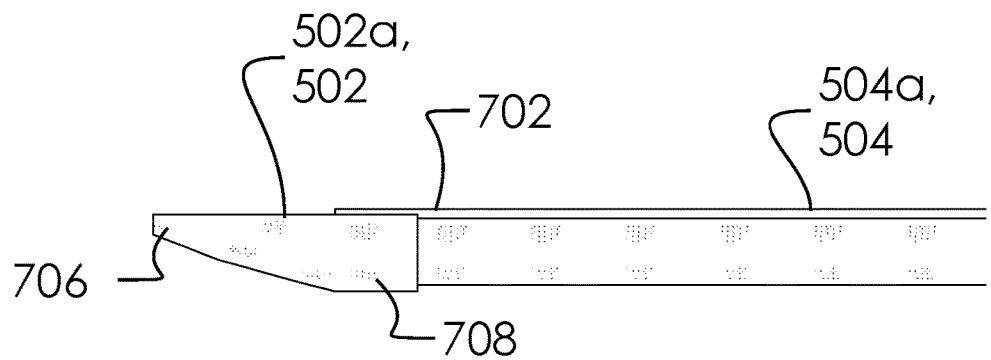
FIG. 7B illustrates an elevated first side view of a rail caps 502.

FIG. 7B illustrates an elevated first side view of a rail caps 502.

In one embodiment, said rail caps 502 can comprise said leading edge 706 and said trailing edge 708.

In one embodiment, said side runners 504 can comprise said first end 702 and said second end 704.

In one embodiment, said rail caps 502 can comprise a tapered shape being smaller at said leading edge 706 and wider at said trailing edge 708. In one embodiment, said rail caps 502 can fit over said first end 702 of said side runners 504 so as to prevent said sled 102 from digging into a ground surface, in the manner of sleds in other art groups.

Figure 8:
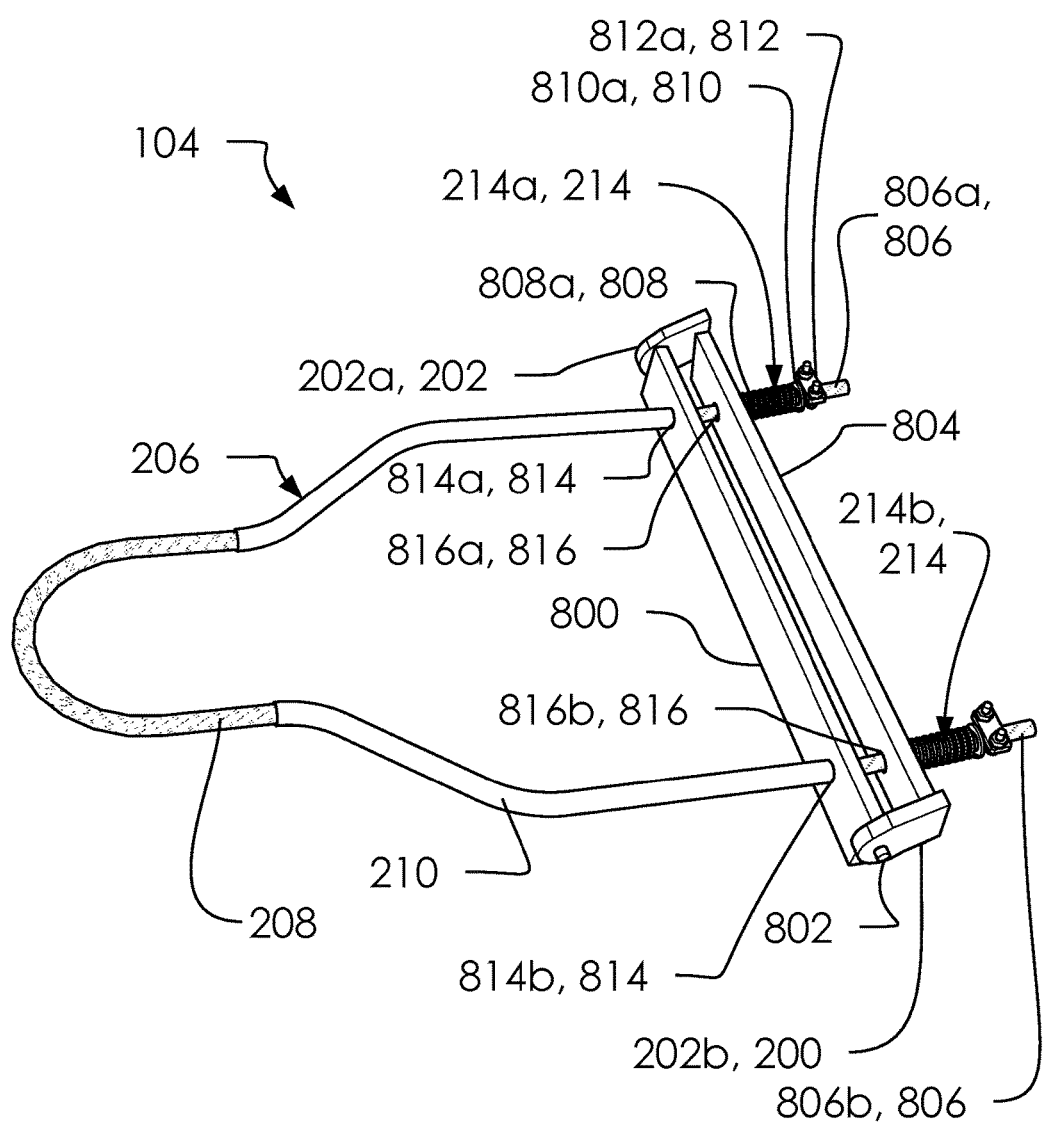
FIG. 8 illustrates a perspective overview view of a hitch assembly 104.

FIG. 8 illustrates a perspective overview view of a hitch assembly 104.

In one embodiment, said cross-beam 800 can comprise said second clamp 812b and said one or more apertures 814.

In one embodiment, said back-bar 804 can comprise said second aperture 814b and said one or more apertures 816.

In one embodiment, said ends 806 can comprise said first end 806a and said second end 806b.

In one embodiment, said one or more springs 808 can comprise said first spring 808a and said second spring 808b.

In one embodiment, said one or more washers 810 can comprise said first washer 810a and said second washer 810b.

In one embodiment, said one or more clamps 812 can comprise said first clamp 812a and said second clamp 812b.

In one embodiment, said one or more apertures 814 can comprise said first aperture 814a and said second aperture 814b.

In one embodiment, said one or more apertures 816 can comprise said first aperture 816a and said second aperture 816b.

In one embodiment, said hitch assembly 104 can comprise said back-bar 804.

In one embodiment, said hitch loop assembly 206 can comprise said cross-beam 800 and said bar 802.

In one embodiment, said cable portion 208 can comprise said back-bar 804 and said ends 806.

In one embodiment, said one or more spring clamps 214 can comprise said second end 806b, said one or more springs 808, said second spring 808b, said one or more washers 810, said second washer 810b and said one or more clamps 812.

In one embodiment, said one or more spring clamps 214 can pull against said cable portion 208 as it is moved by said hitch loop assembly 206.

In one embodiment, said hitch loop assembly 206 can rotate on said bar 802 between said side bracket assemblies 202. In one embodiment, said cross-beam 800 can be fit between said side bracket assemblies 202 and rotate with said hitch loop assembly 206. In one embodiment, a portion of said bar 802 can pass through a portion of said cross-beam 800.

In one embodiment, said cable portion 208 can pass through said sleeve portion 210, said cross-beam 800, and said back-bar 804, and be clamped on said ends 806 with said one or more spring clamps 214. In one embodiment, said ends 806 can pass through said one or more springs 808, said one or more washers 810 and be held with said one or more clamps 812.

In one embodiment, said cross-beam 800 can comprise said one or more apertures 814;

said back-bar 804 can comprise said one or more apertures 816;

and said one or more apertures 814 can be aligned with said one or more apertures 816.

Figure 9:
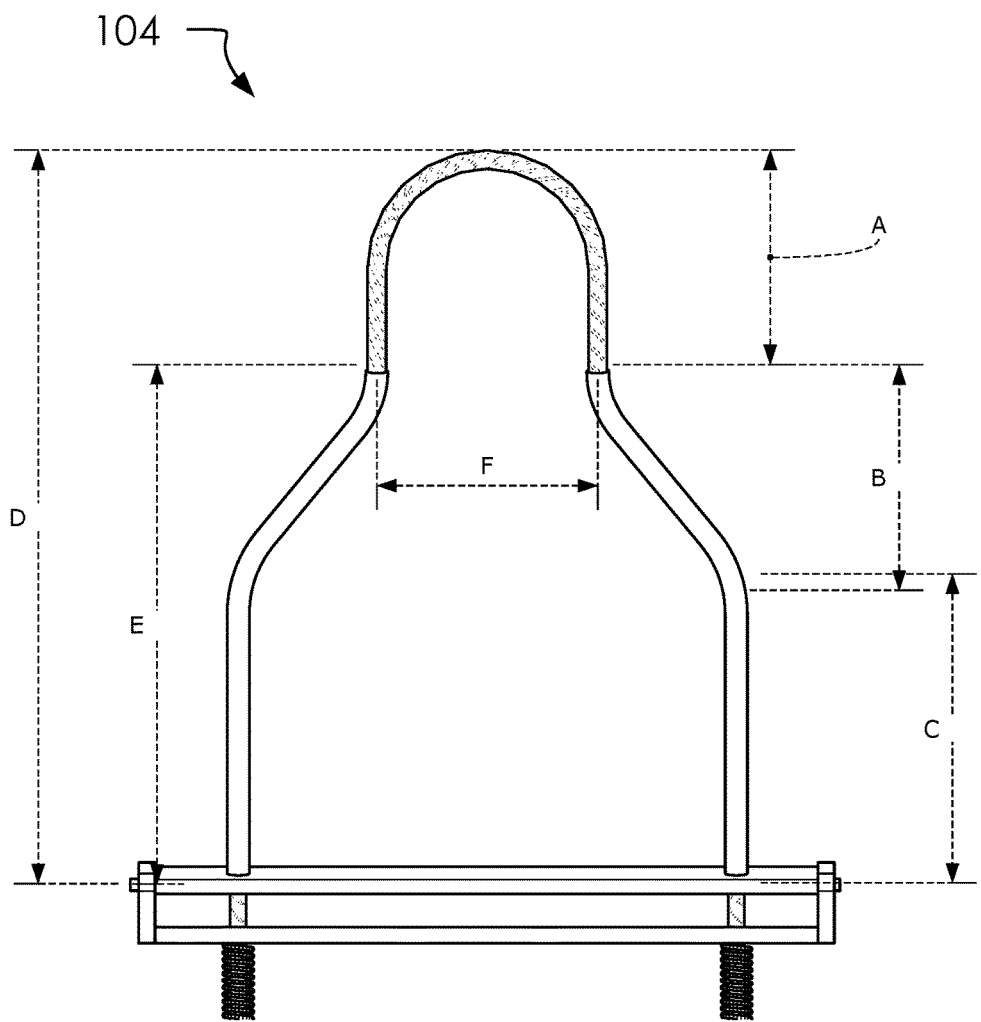
FIG. 9 illustrates an elevated top side view of a hitch assembly 104.

FIG. 9 illustrates an elevated top side view of a hitch assembly 104.

Figure 10:
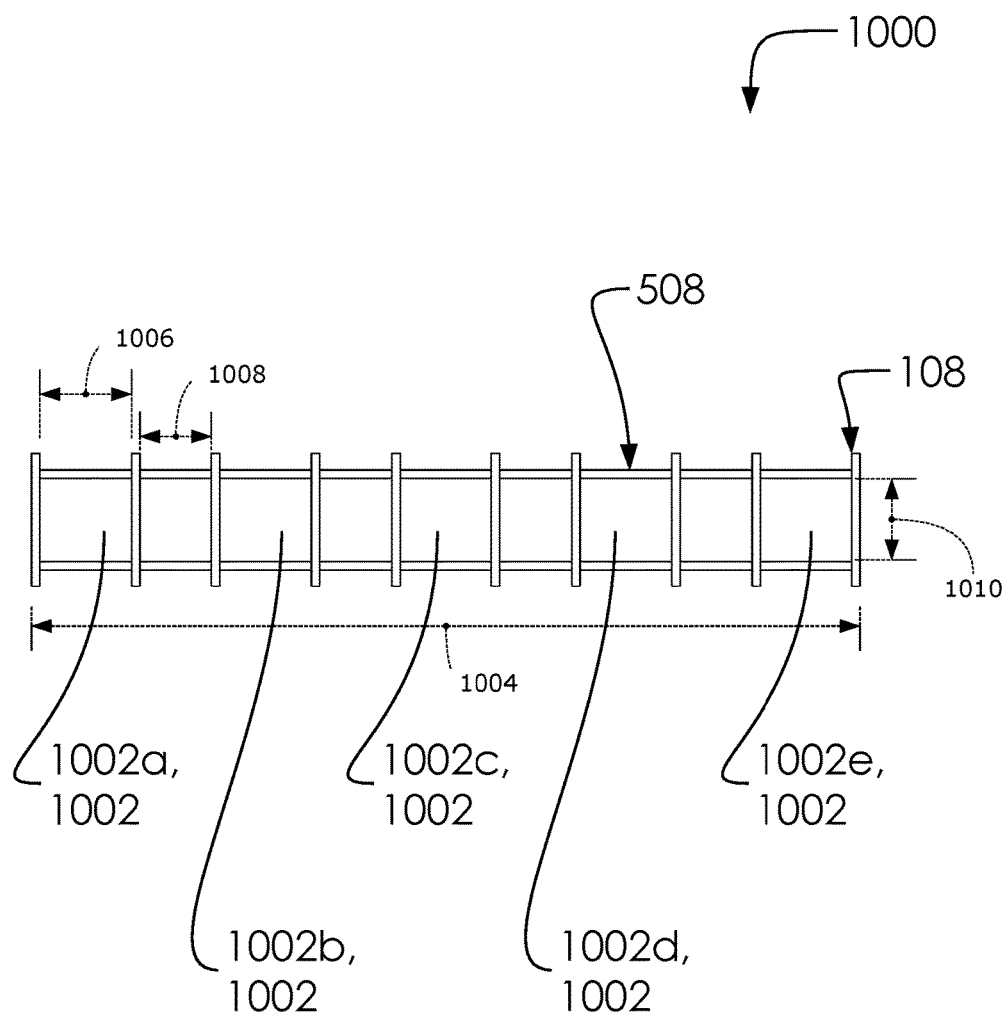
FIG. 10 illustrates an elevated top side view of a cross beams 108.

FIG. 10 illustrates an elevated top side view of a cross beams 108.

In one embodiment, said one or more cradles 1002 can comprise said first cradle 1002a, said second cradle 1002b, said third cradle 1002c, said fourth cradle 1002d and said fifth cradle 1002e.

In one embodiment, said sled assembly 100 can comprise said cross-beam structure 1000, said cross-beam structure 1000, said one or more cradles 1002, said length 1004, said cradle length 1006, said gap length 1008, said cradle width 1010 and said cradle width 1010.

In one embodiment, said cradle length 1006 can comprise 6 feet.

In one embodiment, said one or more cradles 1002 can receive round bales of many types, such as hay and/or cotton or other agricultural materials.

Figure 11A:
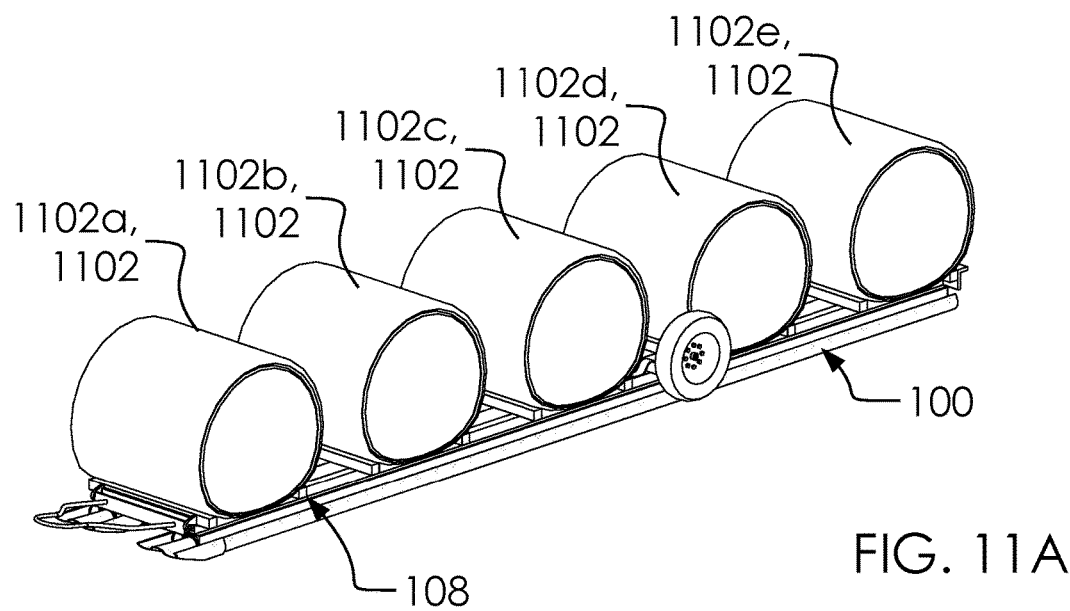
FIGS. 11A, 11B and 11C illustrate a perspective overview, an elevated top view and an elevated front view of a one or more round bales 1102.
Figure 11B:
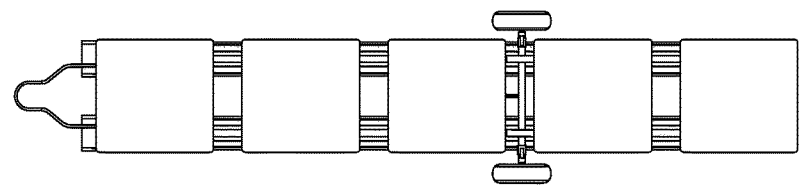
Figure 11C:
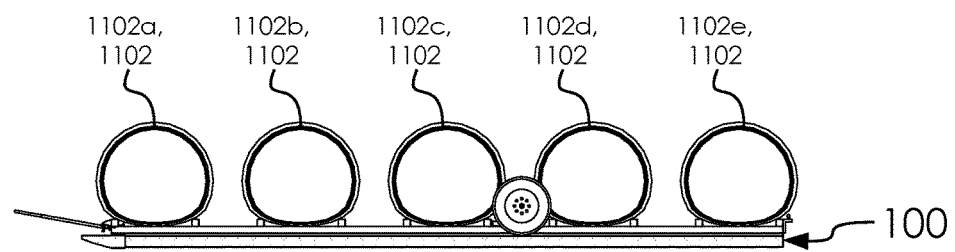

FIGS. 11A, 11B and 11C illustrate a perspective overview, an elevated top view and an elevated front view of a one or more round bales 1102.

In one embodiment, said one or more round bales 1102 can comprise said first bale 1102a, said second bale 1102b, said third bale 1102c, said fourth bale 1102d, said fifth bale 1102e and said sixth bale 1102f.

In one embodiment, said sled assembly 100 can comprise said sixth bale 1102f.

In one embodiment, said one or more round bales 1102 can sit in said one or more cradles 1002.

Figure 12:
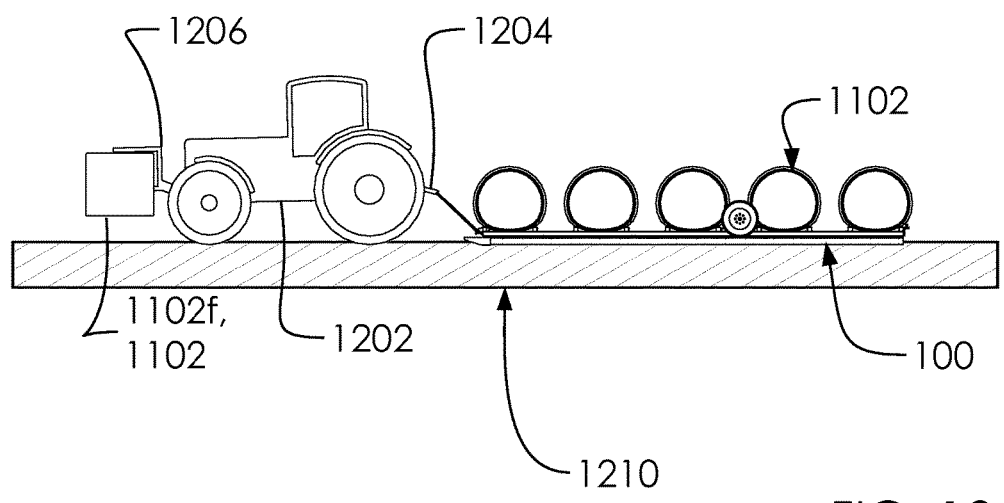
FIG. 12 illustrates an elevated first side view of a vehicle 1202.

FIG. 12 illustrates an elevated first side view of a vehicle 1202.

In one embodiment, said vehicle 1202 can comprise said receiver hitch 1204 and said bale holder 1206.

In one embodiment, said side runners 504 can comprise said ground surface 1210.

In one embodiment, said vehicle 1202 can comprise a tractor.

Figure 13:
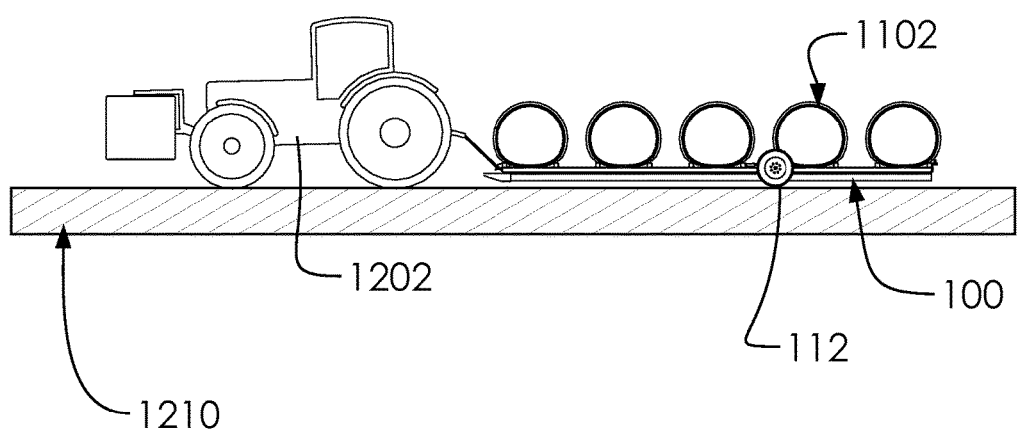
FIG. 13 illustrates an elevated first side view of a one or more wheel assemblies 1300.

FIG. 13 illustrates an elevated first side view of a one or more wheel assemblies 1300.

In one embodiment, said one or more wheel assemblies 1300 can comprise said first wheel assembly 1300a and said second wheel assembly 1300b.

In one embodiment, said sled assembly 100 can comprise said one or more wheel assemblies 1300.

In one embodiment, said one or more wheel assemblies 1300 can comprise wheels, as is known in the art. Said one or more wheel assemblies 1300 can attach to said sled 102 and provide a means of moving said sled assembly 100 across a hard surface, such as when said vehicle 1202 and/or said one or more round bales 1102 need to be moved across or down a paved road.

In one embodiment, said one or more wheel assemblies 1300 can comprise ratchet wheels.

Figure 14A:
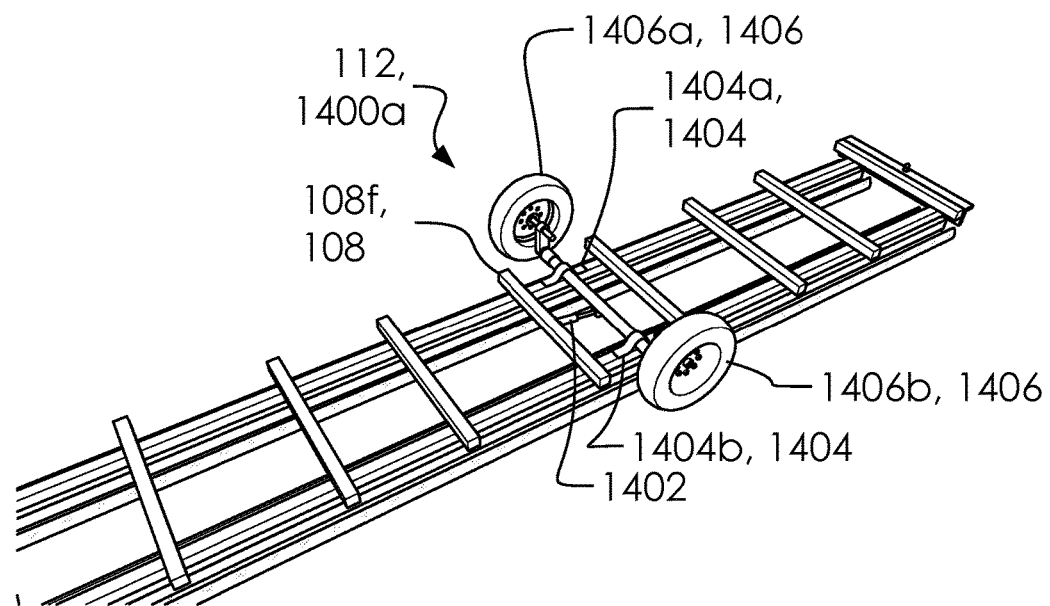

FIG. 14A illustrates a perspective overview view of a first wheel configuration 1400a.

Figure 14B:
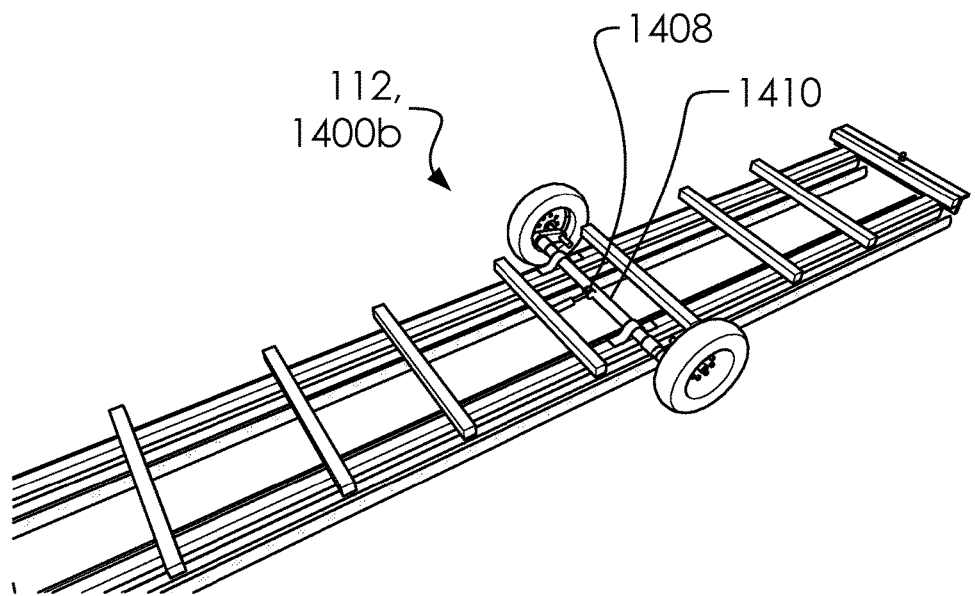
FIG. 14B illustrates a perspective overview view of a second wheel configuration 1400b.

FIG. 14B illustrates a perspective overview view of a second wheel configuration 1400b.

In one embodiment, said one or more clamps 1404 can comprise said first clamp 1404a and said second clamp 1404b.

In one embodiment, said one or more wheels 1406 can comprise said first wheel 1406a and said second wheel 1406b.

In one embodiment, said wheel assembly 112 can comprise said first wheel configuration 1400a, said second wheel configuration 1400b, said spreader 1402, said spreader 1402, said one or more clamps 1404, said second clamp 1404b, said one or more wheels 1406, said hinge 1408 and said axel 1410.

Said wheel assembly 112 can rotate between said first wheel configuration 1400a and said second wheel configuration 1400b.

In one embodiment, said spreader 1402 can rotate said wheel assembly 112 so as to selectively raise and lower said one or more wheels 1406. Said spreader 1402 can attach to one among said cross beams 108 (such as said cross beam 108f) and said axel 1410.

Figure 15A:
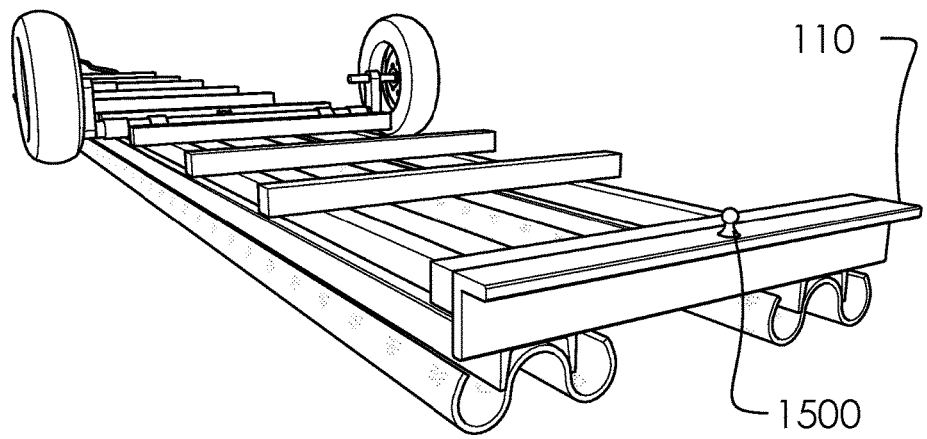
FIGS. 15A and 15B illustrate a perspective overview of a bumper assembly 110 and a train configuration 1502.
Figure 15B:
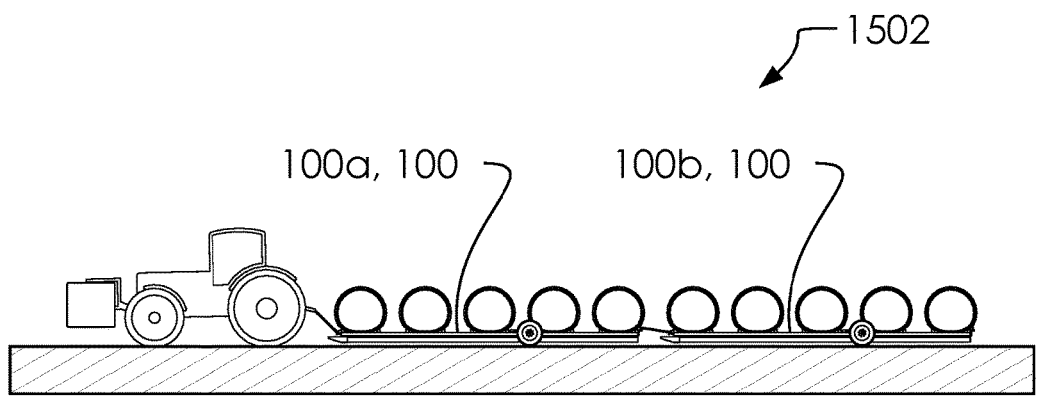

FIGS. 15A and 15B illustrate a perspective overview view of a bumper assembly 110 and an elevated front view of a train configuration 1502.

In one embodiment, said bumper assembly 110 can comprise said hitch ball 1500 and said train configuration 1502.

In one embodiment, said bumper assembly 110 can comprise said hitch ball 1500, adapted to selectively attach to said hitch assembly 104 or other equipment, as is known in the art.

In one embodiment, said hitch ball 1500 of said first sled assembly 100a can attach to said hitch assembly 104 of said second sled assembly 100b Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A sled assembly for the transport of a one or more round bales across a ground surface being soft comprising:
a sled configured to slide on top of said ground surface;
a hitch assembly having a lowered configuration and a raised configuration;
said hitch assembly configured to selectively attach to a vehicle and to enable said sled assembly to be dragged behind said vehicle;
said sled comprising a side rail assemblies and a cross beams;
said hitch assembly fixed to a first end of said sled;
said sled assembly further comprising wheel assemblies comprising a first wheel assembly and a second wheel assembly;

said wheel assemblies configured to selectively attach to a portion of said sled and enable to said sled assembly to roll across paved surfaces;

said wheel assemblies wheel assemblies comprise ratchet wheels configured to selectively raise said rail assemblies off of the ground and selectively drop said rail assemblies onto the ground;

said sled comprises a front end and a rear end;

said hitch assembly attached to said front end of said sled;

said wheel assemblies are attached to said sled closer to said rear end than said front end of said sled; and said sled assembly is configured to selectively balance a load on said sled with said wheel assemblies engaged to lift said rail assemblies off the ground.

2. A sled assembly for the transport of a one or more round bales across a ground surface being soft comprising:

a sled configured to slide on top of said ground surface;

a hitch assembly having a lowered configuration and a raised configuration;

said hitch assembly configured to selectively attach to a vehicle and to enable said sled assembly to be dragged behind said vehicle;

said sled comprising a side rail assemblies and a cross beams;

said hitch assembly fixed to a first end of said sled;

said hitch assembly comprising a rotating axis, side bracket assemblies, springs, spring clamps and a hitch loop assembly;

said hitch assembly further comprising a cable portion and a sleeve portion;

a side runners further comprising a first end and a second end;

said spring clamps comprise a first spring clamp and a second spring clamp;

said springs comprise a first spring and a second spring;

said cable portion is attached to said sled at a first end;

said cable portion comprises a first end and a second end;

said first end of said cable portion attaches to said first spring clamp, passes through a portion of said first spring, passes through a portion of said first end of said sled, passes through a first portion of said sleeve portion, is exposed before entering into a second portion of said sleeve portion, passes once again through a portion of said first end of said sled, passes through a portion of said second spring, and is secured with said second spring clamp;

spring clamps pull against said cable portion as it is moved by said hitch loop assembly;

said springs and said spring clamps attached to said cable portion are configure to absorb shock when said vehicle pulls said sled.

3. The sled assembly of claim 2 further wherein, said hitch loop assembly rotates on a bar affixed between said side bracket assemblies;

a cross-beam is fit between said side bracket assemblies being configured to rotate with said hitch loop assembly;

a portion of said bar passes through a portion of said cross-beam.

4. The sled assembly of claim 2 further wherein, said cable portion passes through said sleeve portion, said cross-beam, and said back-bar, and is clamped on said ends with said spring clamps; and said ends pass through said springs, said one or more washers and are held with said spring clamps.

5. The sled assembly of claim 4 further wherein, said cross-beam comprises apertures;

said back-bar comprises apertures; and said apertures of said cross-beam and said back-bar are aligned.

6. A sled assembly for the transport of a one or more round bales across a ground surface being soft comprising:

a sled configured to slide on top of said ground surface;

a hitch assembly having a lowered configuration and a raised configuration;

said hitch assembly configured to selectively attach to a vehicle and to enable said sled assembly to be dragged behind said vehicle;

said sled comprising a side rail assemblies and a cross beams;

said hitch assembly fixed to a first end of said sled;

said sled assembly further comprising a one or more wheel assemblies;

said one or more wheel assemblies configured to selectively attach to a portion of said sled and enable to said sled assembly to roll across paved surfaces;

said hitch assembly comprising a rotating axis, side bracket assemblies and a hitch loop assembly;

said hitch assembly further comprising a cable portion and a sleeve portion;

a side runners further comprising a first end and a second end;

a side runners comprising a plurality of lower runner interfaces configured to spread out a load on said sled with respect to the ground so as to decrease packing of the ground as compared to sleds using wheels to roll over the ground;

said first end of said cable portion attaches to said first spring clamp, passes through a portion of said first spring, passes through a portion of said first end of said sled, passes through a first portion of said sleeve portion, is exposed before entering into a second portion of said sleeve portion, passes once again through a portion of said first end of said sled, passes through a portion of said second spring, and is secured with said second spring clamp;

said springs and said spring clamps attached to said cable portion are configure to absorb shock when said vehicle pulls said sled.

7. The sled assembly of claim 6 further wherein, said side rail assemblies comprising a rail caps, a side runners, and an upper beams;

said side runners comprise a first end and a second end;

said rail caps comprise a leading edge and a trailing edge;

said rail caps comprise a tapered shape being smaller at said leading edge and wider at said trailing edge; and said rail caps are configured to fit over said first end of said side runners to prevent said sled from digging into a ground surface.

* * * * *